(12) United States Patent  
Michael et al.

(10) Patent No.: US 7,787,213 B1  
(45) Date of Patent: Aug. 31, 2010

(54) DISK DRIVE FLOW CONTROL PLATE WITH INTEGRATED AIR MANAGEMENT FEATURES

(75) Inventors: A. David L. Michael, Auburndale, MA (US); Ed Acciardi, Grafton, MA (US); Narayanan Ramakrishnan, Pittsburgh, PA (US)

(73) Assignee: Maxtor Corporation, Longmont, CO (US)

( * ) Notice: Subject to any disclaimer, the term of this patent is extended or adjusted under 35 U.S.C. 154(b) by 869 days.

(21) Appl. No.: 11/608,017

(22) Filed: Dec. 7, 2006

Related U.S. Application Data

(60) Provisional application No. 60/748,806, filed on Dec. 9, 2005, provisional application No. 60/820,555, filed on Jul. 27, 2006.

(51) Int. Cl.
*G11B 33/02* (2006.01)
*G11B 33/14* (2006.01)
(52) U.S. Cl. .................................... 360/97.03
(58) Field of Classification Search ............. 360/97.02, 360/97.03, 98.01, 97.01
See application file for complete search history.

(56) References Cited

U.S. PATENT DOCUMENTS

| 5,860,626 | A  * | 1/1999  | Moser ........................ 244/200 |
| 6,456,454 | B1 * | 9/2002  | Slezak ...................... 360/97.03 |
| 6,545,842 | B2 * | 4/2003  | Rao et al. ................. 360/244.2 |
| 6,788,493 | B1   | 9/2004  | Subramaniam et al. |
| 7,072,140 | B2 * | 7/2006  | Asano et al. ............. 360/97.02 |
| 7,420,775 | B2 * | 9/2008  | Lim ........................ 360/97.03 |
| 2005/0190488 | A1 * | 9/2005  | Chan et al. ............... 360/97.02 |
| 2005/0270691 | A1 * | 12/2005 | Pottebaum et al. ........ 360/97.02 |
| 2006/0028760 | A1 * | 2/2006  | Zuo et al. ................. 360/97.02 |
| 2006/0114603 | A1 * | 6/2006  | Ser et al. .................. 360/97.02 |

* cited by examiner

*Primary Examiner*—Jefferson Evans
(74) *Attorney, Agent, or Firm*—Shumaker & Sieffert, P.A.

(57) ABSTRACT

A flow control plate (152) for a disk drive is disclosed. The flow control plate (152) includes both a diffuser section (156) and an air displacement section (168). The diffuser section (156) is contained within a pocket (160) having a plurality of spaced protuberances or ridges (164). The air displacement section (168) may be located upstream of the diffuser section (156) and includes a pair of flat primary surfaces (172) that are disposed in opposing and parallel relation. In one embodiment, the flow control plate (152) is an integral structure and is fabricated from a resinous material.

25 Claims, 12 Drawing Sheets

DISK DRIVE FLOW CONTROL PLATE WITH INTEGRATED AIR MANAGEMENT FEATURES

CROSS-REFERENCE TO RELATED APPLICATIONS

This patent application claims priority under 35 U.S.C. §119(e) to U.S. Provisional Patent Application Ser. No. 60/748,806, that was filed on Dec. 9, 2005, and that is entitled "Flow Control Plate with Integrated Air Management," as well as to U.S. Provisional Patent Application Ser. No. 60/820,555, that was filed on Jul. 27, 2006, and that is entitled "Disk Drive Flow Control Plate with Integrated Air Management Features." The entire disclosure of each of the above-noted patent applications is hereby incorporated by reference in their entirety herein.

FIELD OF THE INVENTION

The present invention generally relates to disk drives and, more particularly, to addressing the airflow within the disk drive.

BACKGROUND OF THE INVENTION

Disk drives include one or more data storage disks that are rotated by a spindle motor. Those surfaces of the various data storage disks that are to be used by the drive for data storage purposes will have an associated head-gimbal assembly. A typical head-gimbal assembly configuration is in the form of a flexible suspension or load beam, a flexure that is mounted on the suspension, and a slider that is mounted on a flexure tongue of the flexure and that carries an appropriate read/write transducer or head. The suspension of each head-gimbal assembly may be mounted on an actuator (e.g., an individual rigid actuator arm; a rigid actuator arm tip of an E-block or the like), which in turn is mounted on a pivot bearing and rotated by a voice coil motor. Generally, each suspension biases its corresponding slider toward the corresponding data storage surface of one of the data storage disks used by the drive.

Each of the data storage disks used by the drive is simultaneously rotated for normal disk drive operations. As the rotational speeds of the data storage disks has increased, so too has the airflow within the disk drive housing that contains many of the components used by the drive. Airflow within the enclosure defined by the disk drive housing may adversely affect one or more aspects of disk drive operations.

Data is stored using a plurality of concentrically disposed tracks that exist on each data storage surface of a data storage disk. Decreasing the spacing between adjacent data storage tracks increases the track density, and thereby the storage capacity of the data storage disk for a given fixed disk size. Track misregistration or TMR relates to the positioning of a read/write head relative to a particular track on the corresponding data storage surface of a particular data storage disk. Increased airflows between adjacent disks of the drive therefore may increase, augment, or enhance TMR. TMR may undesirably increase the access time (e.g., the time required to access data from a particular track), may lead to a loss of data, or both.

SUMMARY OF THE INVENTION

A first aspect of the present invention is directed to a disk drive having a rotatable first data storage disk and a first flow control plate. The first flow control plate includes at least two distinct sections—a diffuser section and an air displacement section. The entirety of the diffuser section is located or contained within a first pocket formed on the first flow control plate, while the entirety of the air displacement section is located outside of this first pocket.

A second aspect of the present invention is directed to a disk drive having a first data storage disk and a first flow control plate. The first flow control plate in turn includes a diffuser section, an air displacement section, and a plurality of protuberances. Each of the plurality of protuberances is located within the diffuser section. The angular extent of the air displacement section relative to a rotational axis of the first data storage disk is greater than an angular extent of the diffuser section relative to this same rotational axis. The air displacement section is in the form of a pair of flat surfaces that are oppositely disposed, and lacks any protuberance of the type used by the diffuser section. One of the flat surfaces of the air displacement section faces the first data storage disk.

A third aspect of the present invention is directed to a disk drive having an actuator, first and second first transducers, first and second data storage disks, and first and second flow control plates. The first and second transducers are each interconnected with the actuator, and the first and second data storage disks are associated with the first and second transducers, respectively (e.g., signals are exchanged between the first transducer and the first data storage disk; signals are exchanged between the second transducer and the second data storage disk). The first and second flow control plates are associated with the first and second data storage disks, respectively, and are separate parts. Generally, the first and second flow plates may be characterized as being separately disposed or positioned in a common stack. The first and second flow control plates are also of a common configuration. There are at least two distinct sections of the first and second flow control plates—a diffuser section and an air displacement section. Each diffuser section includes a plurality of axially extending protuberances that are angularly spaced, and each air displacement section includes a pair of opposing, flat surfaces that are parallel with each of said first and second data storage disks.

DETAILED DESCRIPTION

Figure 1:
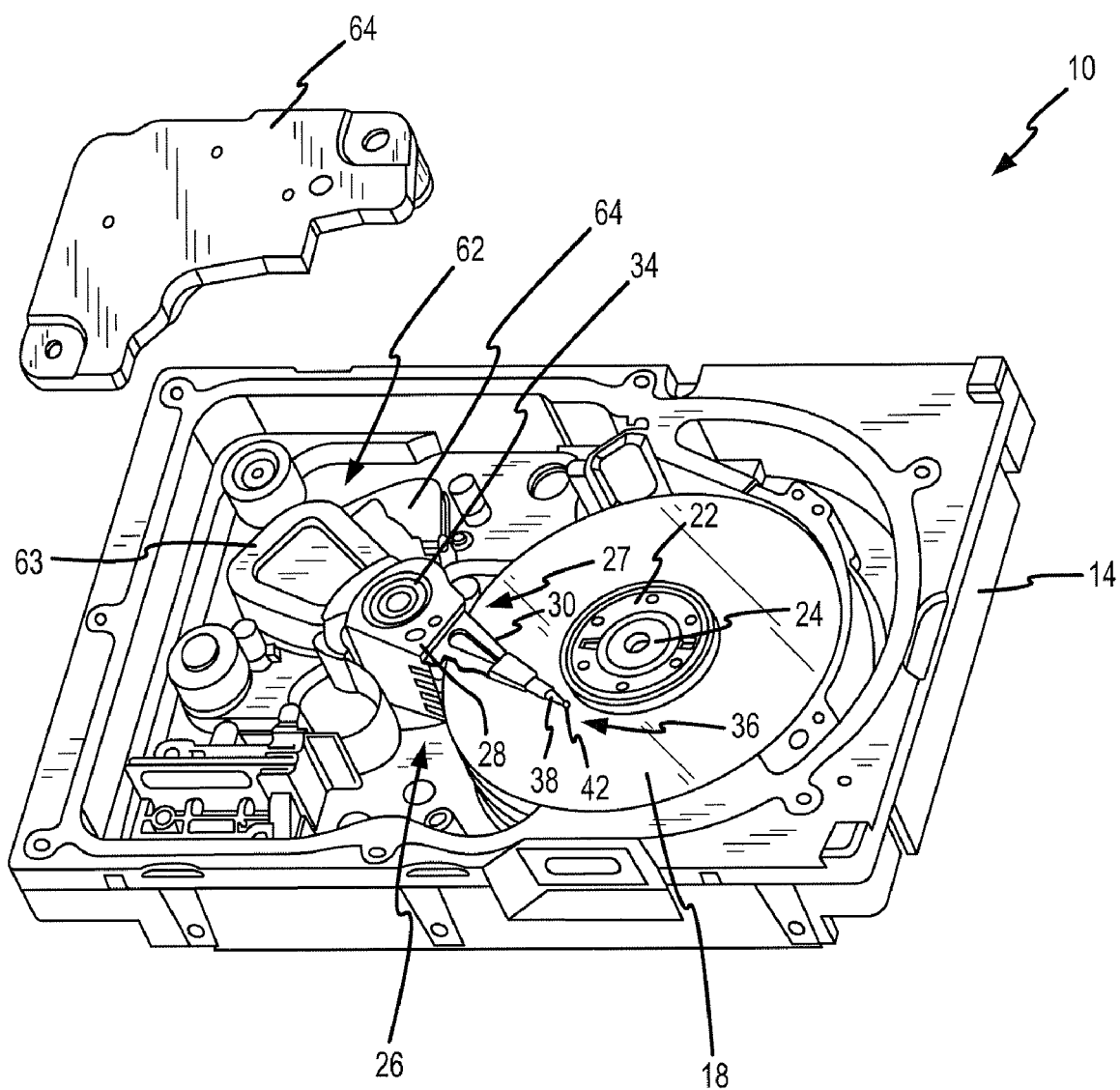
FIG. 1 is a perspective view of one embodiment of a disk drive that may incorporate one or more flow control plates with certain integrated air management features.
Figure 2:
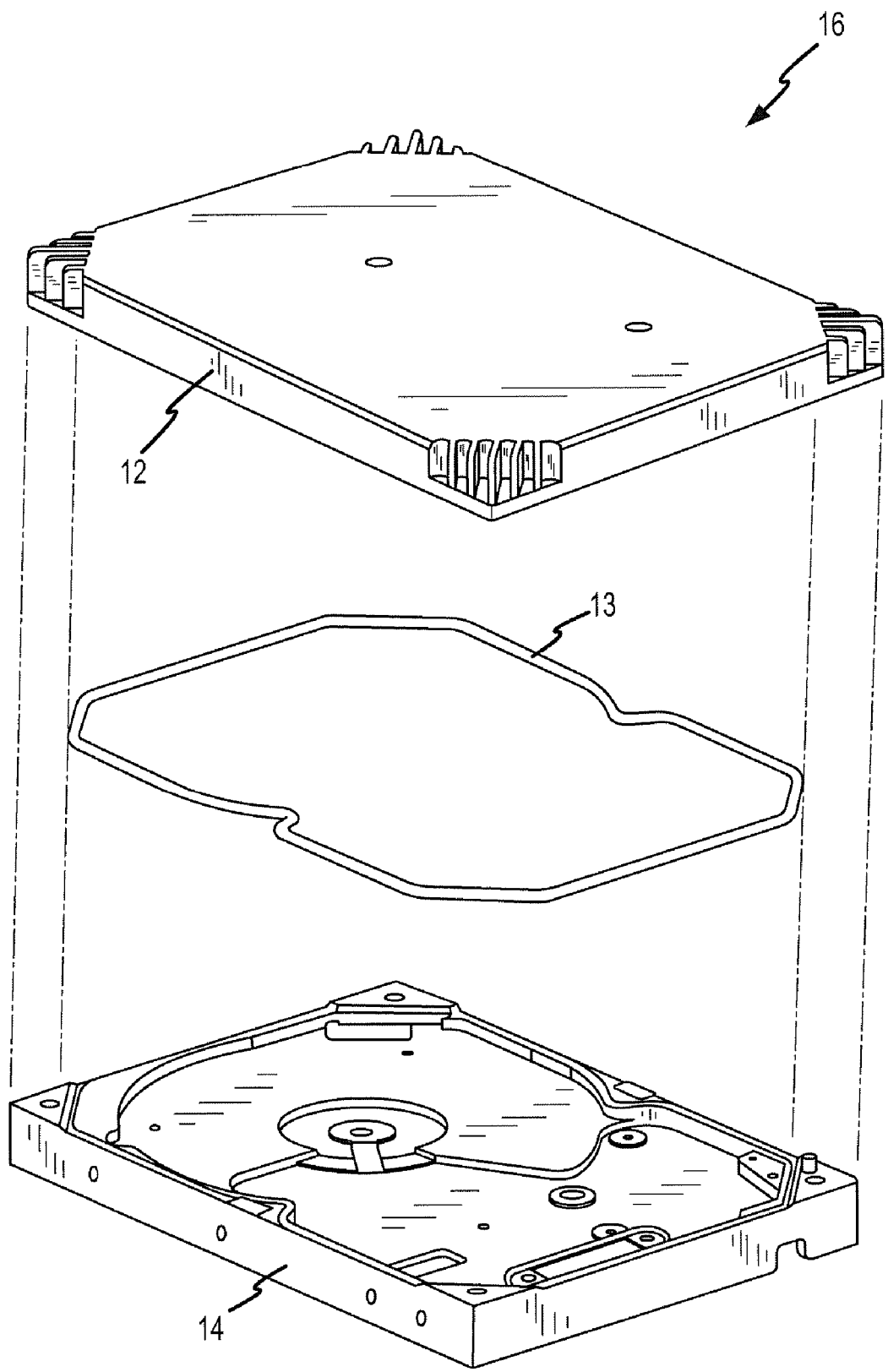
FIG. 2 is an exploded, perspective view of one embodiment of a disk drive housing of the general type that may be used the disk drive of FIG. 1.
Figure 3:
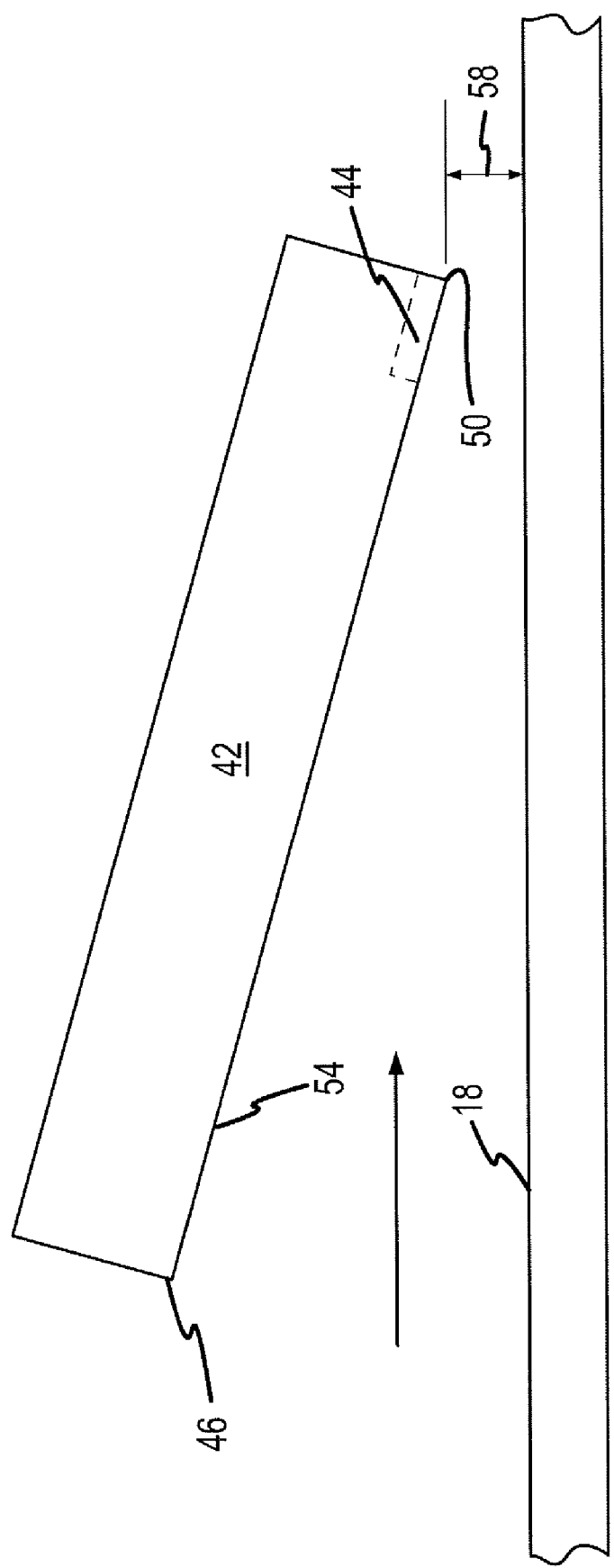
FIG. 3 is a schematic representation of a flying-type slider that may be used by the disk drive of FIG. 1.

One embodiment of a disk drive 10 is illustrated in FIGS. 1-3, and which may include one or more flow control plates 152 (not shown in FIG. 1, but shown in FIGS. 5-7 and discussed below) with certain integrated air management features. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween. The housing 16 shown in FIG. 2 may require adaptation for the disk drive configuration shown in FIG. 1.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM magnet assembly") 64 that is disposed above and below this coil 63 (the upper VCM magnet assembly 64 being "exploded away" in FIG. 1). The VCM magnet assemblies 64 will typically be mounted on the housing 16 in a fixed position, with the upper VCM magnet assembly 64 being appropriately supported above the lower VCM magnet assembly 64. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18).

Figure 4A:
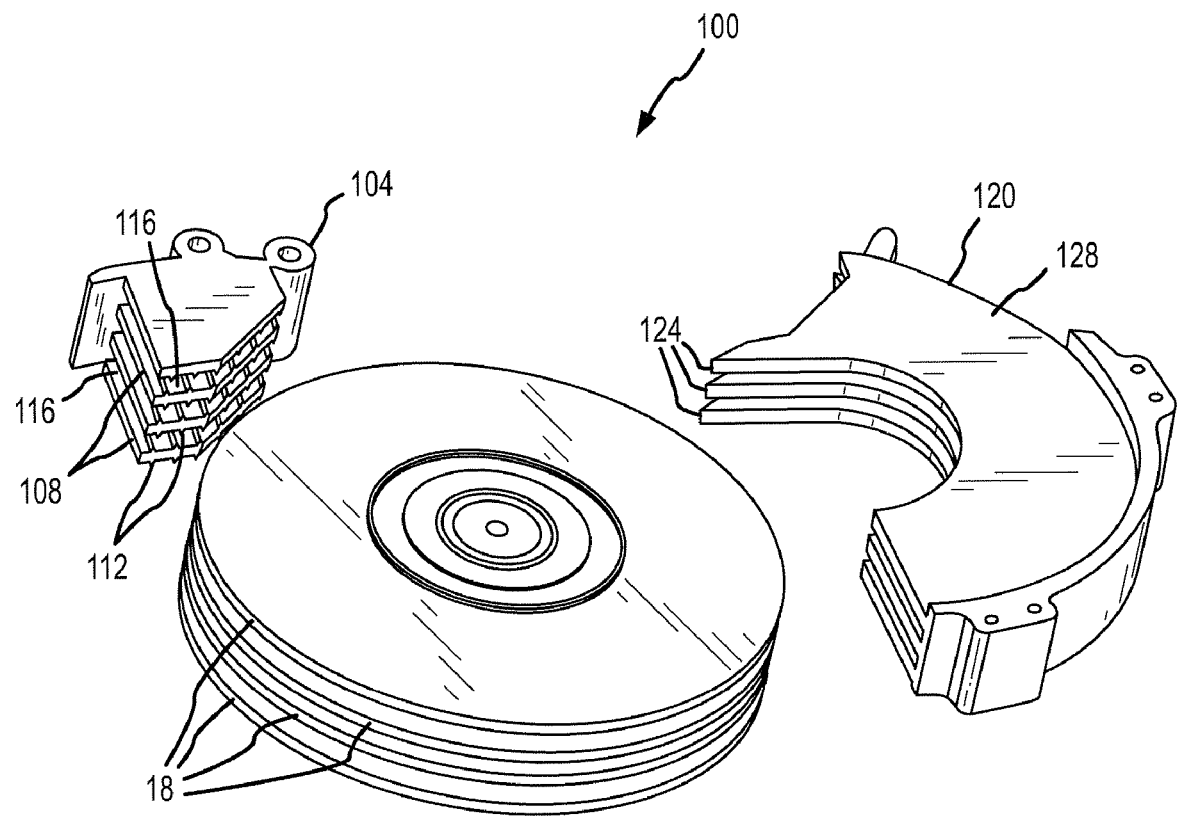
FIG. 4A in one prior art disk drive airflow management system that uses a separate diffuser and a separate air displacement comb.

Rotation of the various data storage disks of the disk drive generates an airflow within the drive. Various options have been pursued to attempt to manage this airflow. One prior art disk drive airflow management system is illustrated in FIG. 4A and is identified by reference numeral 100. Generally, the disk drive airflow management system 100 is in the form of a separate diffuser 104 and a separate air displacement comb 120 that are each used in relation to the various data storage disks of the associated disk drive. The diffuser 104 is positioned upstream of the head stack assembly of the associated disk drive, while the air displacement comb 120 is positioned upstream of the diffuser 104. "Upstream" means in the opposite direction of the direction that the various data storage disks are rotating.

The diffuser 104 of the disk drive airflow management system 100 includes a plurality of diffuser plates 108 that are spaced in a dimension in which a rotational axis of the data storage disks extends. A diffuser plate 108 is positioned between each adjacent pair of data storage disks. One of the diffuser plates 108 also may be positioned above the uppermost data storage disk, one of the diffuser plates 108 also may be positioned below the lowermost data storage disk, or both. Each side of a diffuser plate 108 that faces a corresponding data storage disk includes a plurality of parallel ridges 112. A flat transition section 116 is disposed between each adjacent pair of ridges 112. A flat transition section 116 is disposed on the downstream side of the most downstream ridge 112 as well.

The air displacement comb 120 of the disk drive airflow management system 100 includes a plurality of air displacement plates 124 that are spaced in a dimension in which a rotational axis of the data storage disks is disposed. Each air displacement plate 124 includes a pair of flat, primary surfaces 128 that are oppositely disposed. An air displacement plate 124 is positioned between each adjacent pair of data storage disks. One of the air displacement plates 124 may be positioned above the uppermost data storage disk, one of the air displacement plates 124 may be positioned below the lowermost data storage disk, or both.

Both the diffuser 104 and the air displacement comb 120 may be metal parts (e.g., aluminum) that are separately machined into the desired configuration, although the diffuser 104 may be formed from plastic as well. It is also typical to merge the diffuser 104 and the air displacement comb 120 into the stack of data storage disks or disk pack prior to loading the stack of data storage disks into the disk drive.

Figure 4B:
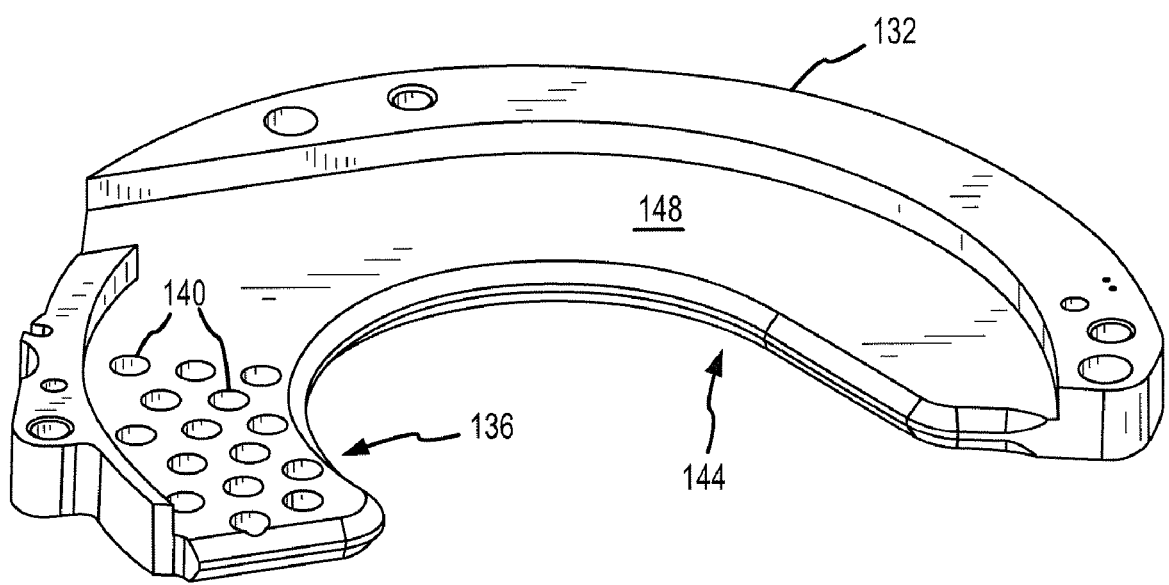
FIG. 4B is another prior art disk drive airflow management system that uses an integral flow control plate having a diffuser section in the form of a plurality of holes, as well with an air displacement section.

Another prior art disk drive airflow management system is illustrated in FIG. 4B and is in the form of a flow control plate 132. One flow control plate 132 may be positioned between each adjacent pair of data storage disks. One flow control plate 132 also may be disposed above the uppermost data storage disk, one of the flow control plates 132 also may be disposed below the lowermost data storage disk, or both. This flow control plate 132 is an integral structure, and includes both a diffuser section 136 and an air displacement section 144. "Integral" means that the flow control plate 132 lacks any joints, such that there is no joint of any kind between the diffuser section 136 and the air displacement section 144. Typically the flow control plate 132 is in the form of a metal part (e.g. aluminum) and is machined into the desired configuration.

The diffuser section 136 of the flow control plate 132 is disposed upstream of the head stack assembly of the associated disk drive, while the air displacement section 144 is positioned upstream of the diffuser section 136. The diffuser section 136 is defined by that portion of the flow control plate 132 that includes a plurality of holes 140 that extend completely through the flow control plate 132. The air displacement section 144 is defined by a pair of flat primary surfaces 148 that are disposed in opposing and parallel relation.

Figure 5:
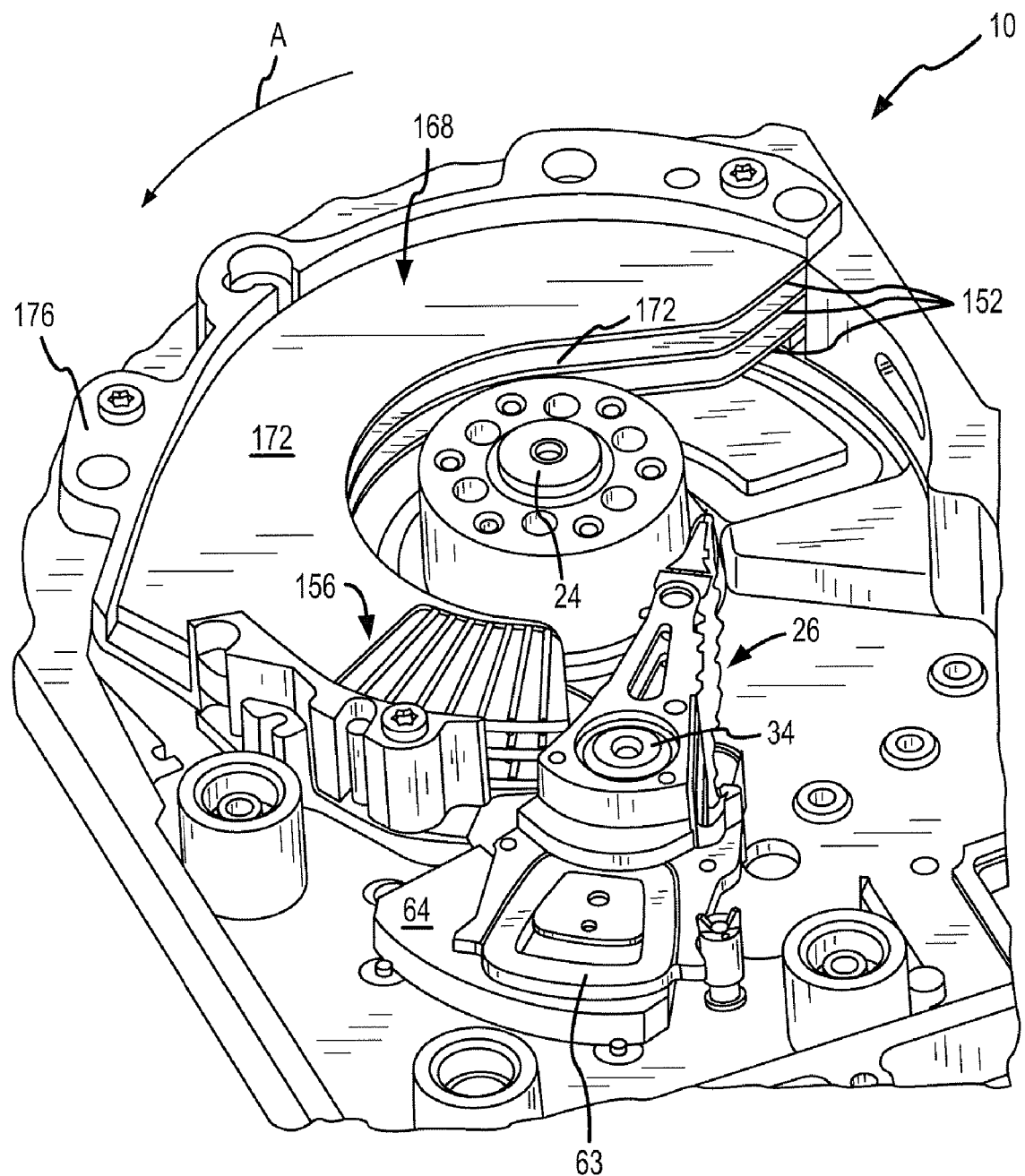
FIG. 5 is a perspective view of a disk drive that incorporates one embodiment of an integral flow control plate with both a protuberance-based diffuser section and an air displacement section.

FIG. 5 illustrates one or more flow control plates 152 that may be used by the disk drive 10 (discussed in detail above in relation to FIGS. 1-3) and which may be of an integral construction. A flow control plate 152 would be disposed between each adjacent pair of data storage disks 18 used by the disk drive 10. One flow control plate 152 may be positioned above the uppermost data storage disk 18 used by the disk drive 10, one flow control plate 152 may be positioned below the lowermost data storage disk 18 used by the disk drive 10, or both. Typically, a flow control plate 152 will be disposed adjacent to, but spaced from, each data storage surface of each data storage disk 18 being used by the disk drive 10. One or more flow control plates 152 may be used in any appropriate disk drive configuration.

Figure 6A:
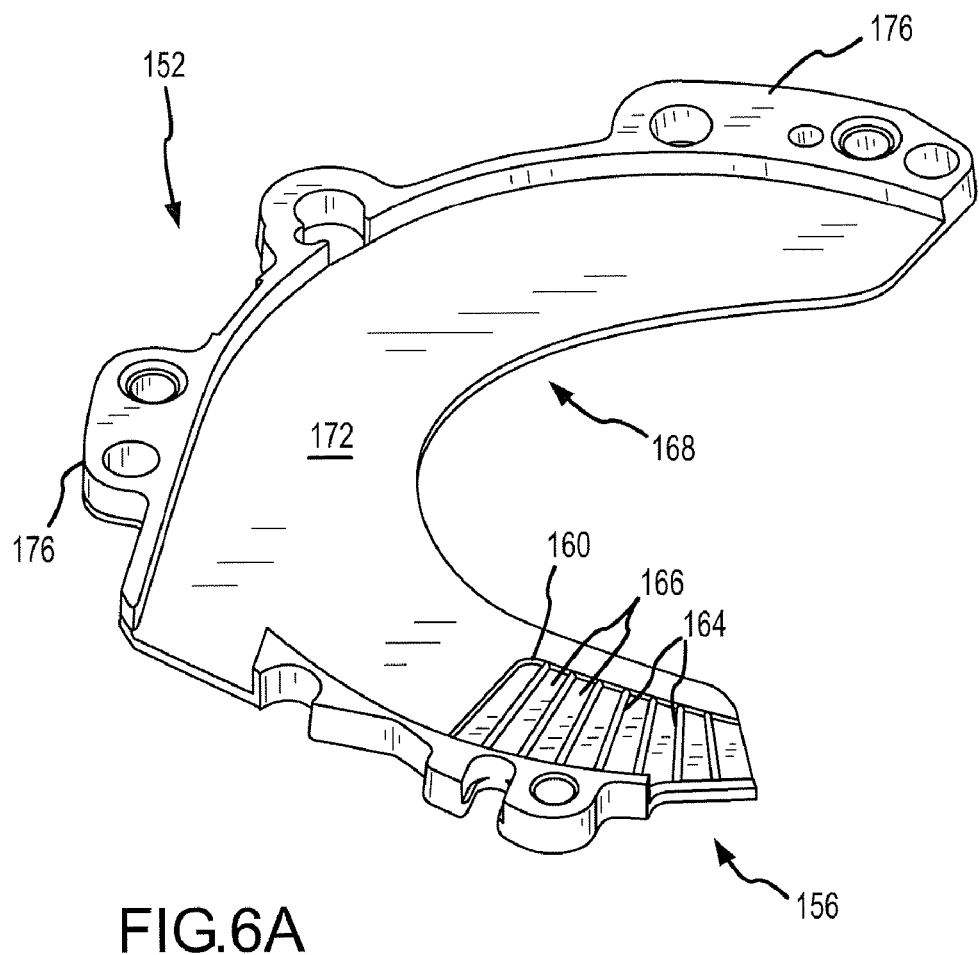
FIG. 6A is a perspective view of the integral flow control plate used by the disk drive of FIG. 5.
Figure 6B:
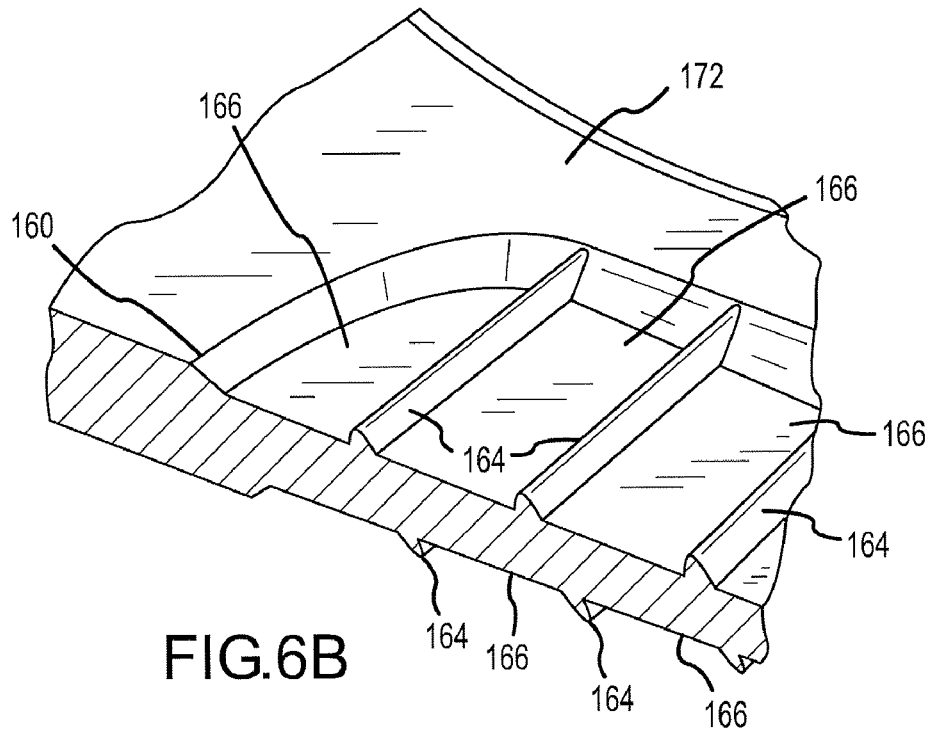
FIG. 6B is an enlarged, perspective view of the diffuser section of the integral flow control plate of FIG. 6A.
Figure 7:
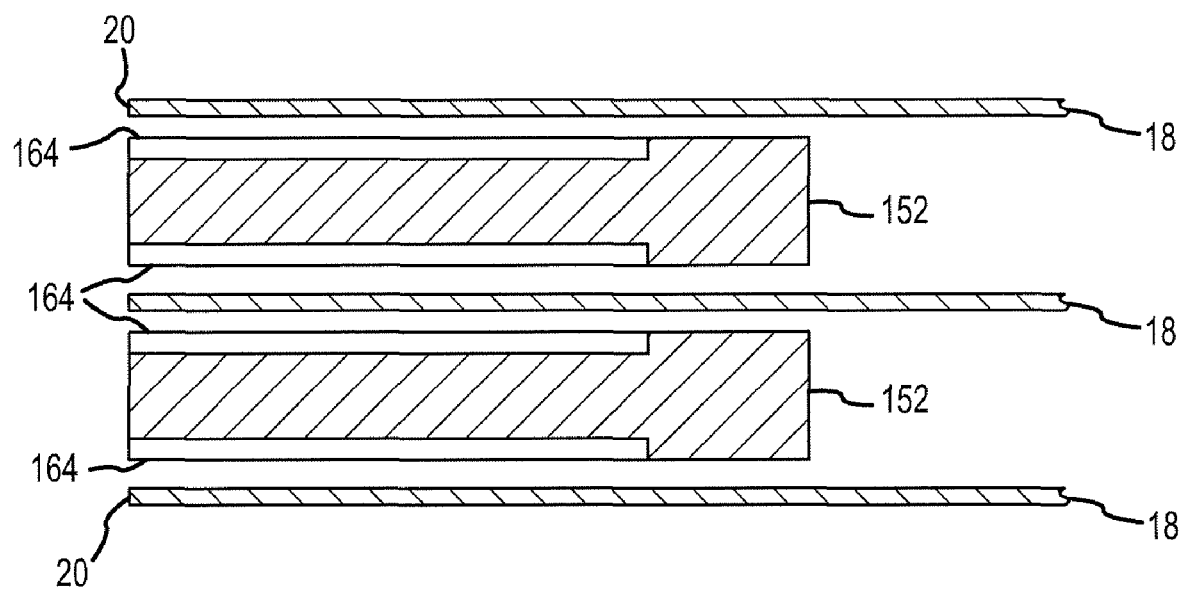
FIG. 7 is a cross-sectional view of the stack of data storage disks used by the disk drive of FIG. 5, along with their associated integral flow control plate.

The flow control plate 152 used by the disk drive 10 is illustrated in FIGS. 6A-B, in addition to FIG. 5. The flow control plate 152 includes a diffuser section 156 and an air displacement section 168, typically on each of its two sides. Those flow control plates 152 that are disposed between adjacent pair of data storage disks 18 will typically include a diffuser section 156 and an air displacement section 168 on each of its two sides. Any flow control plate 152 that is disposed above the uppermost data storage disk 18 or below the lowermost data storage disk 18 need only include a diffuser section 156 on the side that faces a data storage surface of the corresponding data storage disk 18 (but will likely have a diffuser section 156 and an air displacement section 168 on each of its two sides for cost of manufacturing purposes).

The diffuser section 156 of the flow control plate 152 may be disposed upstream of the head stack or head positioner assembly 26 of the disk drive 10, while the air displacement section 168 may be positioned upstream of the diffuser section 156. One rotational direction of the data storage disks 18 used by the disk drive 10 is identified by the arrow A in FIG. 5, although the rotational direction of the disks 18 could be alternated in any appropriate manner during disk drive operations. Therefore, the diffuser section 156 may be positioned between the head stack assembly 26 and the air displacement section 168 proceeding about the rotational axis of the data storage disks 18 in the opposite direction that the data storage disks rotate during disk drive operations (one rotational direction of the data storage disks 18 again being signified by the arrow A in FIG. 5).

The angular extent of the air displacement section 168 may be greater than the angular extent of the corresponding diffuser section(s) 156 in the case of the flow control plate 152. The "angular extent" corresponds with the amount that the air displacement section 168 and diffuser section 156 each extend or proceed about a rotational axis of the data storage disks 18 used by the disk drive 10. An angular extent of 360° would be a structure that extends completely about the noted rotational axis.

There are a number of points of note regarding the diffuser section 156. One is that the entirety of the diffuser section 156 is contained or located within a recess or pocket 160. Another is that the diffuser section 156 further includes a plurality of protuberances or ridges 164 that are disposed within this pocket 160. A flat transition section 166 is disposed on each side of each ridge 164, such that a flat transition section 166 is disposed between each adjacent pair of ridges 164. The various ridges 164 may be of any appropriate size, shape, configuration, and cross-sectional profile, and further may be disposed in any appropriate arrangement that will break up the large turbulent eddies, that carry the bulk of the kinetic energy of the flow, into smaller eddies. Breaking up the eddies below a certain size or length scale would enhance viscous dissipation of the turbulent flow, hence reducing the amplitude of the airflow disturbance on the actuator arm, suspension, head/slider and rotating disks of the associated disk drive. In the illustrated embodiment, the ridges 164 are axially extending, are angularly spaced, and are each disposed along a radii emanating from a rotational axis of the data storage disks 18 used by the disk drive 10.

The diffuser section 156 may be characterized as a filter that retains only the smaller length-scale eddies in the downstream flow. For instance, the diffuser section 156 may be characterized as a structure that removes energy from the air stream or airflow (associated with a rotation of one or more data storage disks 18) by breaking down the larger turbulent eddies to lower length scales, thus enhancing viscous dissipation of the turbulent flow. Further breaking down the larger eddies to smaller length scales would generally increase the frequency associated with the rotational motion of the eddies, thus possibly shifting the disturbance spectrum of the airflow turbulence to a range above the dominant fundamental natural structural frequencies associated with the actuator arm, suspension, head/slider and rotating disks of the associated disk drive. This in turn reduces the amplitude of forced response of these structures.

The diffuser section 156 may also be characterized as a structure that reduces the speed of the airflow in proximity to one or more of the heads 44, to in turn reduce airflow-based vibrations that may adversely affect disk drive operations (e.g., vibrations that induce/augment track misregistration or TMR). The diffuser section 156 may be of any appropriate configuration to provide its desired function. One embodiment again has the diffuser section 156 including a plurality of protuberances 164 of any appropriate size, shape, and/or configuration, and that are disposed in any appropriate arrangement. There are a number of characterizations that may be made in relation to these protuberances 164, which apply individually or in any appropriate combination: 1) the various protuberances 164 may be disposed in spaced relation to each other, such as angularly spaced relative to a rotational axis of the various storage disks 18; 2) a planar surface 166 may be disposed between each adjacent pair of protuberances 164; 3) each protuberance 164 may be axially or linearly extending, for instance so as to extend along a radii extending from a common point or axis such as a rotational axis of the various data storage disks 18; and 4) each protuberance 164 may be in the form of a ridge.

The air displacement section 168 may be in the form of a pair of flat primary surfaces 172 that are oppositely disposed in at least substantially parallel relation. In one embodiment, a primary surface 172 that faces an adjacent, corresponding data storage disk is spaced therefrom by a distance of no more than about 0.50 mm. Typically the various transition sections 166 of the diffuser section 156 will be at least substantially parallel with each of the primary surfaces 172 of the air displacement section 168. The transition sections 166 of the diffuser section 156 on each side of the flow control plate 152 are, however, recessed relative to the primary surface 172 of the air displacement section 168 on the same, corresponding side of the flow control plate 152. The apex of each ridge 164 on each side of the flow control plate 152 does not protrude beyond a reference plane that contains the primary surface 172 of the air displacement section 168 on the same side of the flow control plate 152. In the illustrated embodiment, the apex of each ridge 164 on each side of the flow control plate 152 is coplanar with the primary surface 172 of the air displacement section 168 on the same side of the flow control plate 152.

The air displacement section 168 may be characterized as a structure that reduces the volume in which air may flow in relation to one or more rotating data storage disks 18. For instance, the air displacement section 168 may be characterized as occupying at least some of the space between a pair of adjacently disposed data storage disks 18, which then in turn reduces the volume of air that may be contained between this pair of adjacent data storage disks 18. Further, the reduced spacing between the disks and the opposite surface limits the turbulent eddies to smaller length scales, thereby enhancing the viscous dissipation of the turbulent kinetic energy of the flow. This in turn may reduce the amplitude of flow-induced excitation of the actuator arm, suspension, head/slider and rotating disks of the associated disk drive. In one embodiment, the air displacement section is in the form of a pair of flat surfaces 172 that are oppositely disposed (e.g., parallel with the data storage surfaces of the various data storage disks 18), and further the air displacement section 168 may be devoid of the type of protuberances 164 that may be used by the diffuser section 156. Typically and in order for both the diffuser section 156 and air displacement section 168 to provide their desired, respective functions, the flow control plate 152 will be disposed in closely spaced relation to the associated data storage surface of one or more data storage disks 18 (e.g., where one of the flat surfaces 172 of the air displacement section 168 is separated from a data storage surface of an adjacent data storage disk 18 by a distance of no more than about 0.50 mm).

As noted above, the flow control plate 152 may be in the form of an integral structure—there are no joints of any kind, and including no joints between the diffuser section 156 and the air displacement section 168 in this case. Although the flow control plate 152 may be formed from any appropriate material or combination of materials, in one embodiment the flow control plate 152 is formed from a resinous material (e.g., one or more resins; a "plastic"). Although the flow control plate 152 may be fabricated in any appropriate manner, in one embodiment the flow control plate 152 is a molded part. Molding the flow control plate 152 from a resinous material is a cost-effective approach, particularly when diffuser features are included as shown. The integrated flow control plate 152 in general reduces the complexity and time involved in the assembly of airflow management devices in disk drives compared to say, for instance, the case where diffuser-like devices and air-displacement devices are incorporated separately. Further, the integrated flow control plate 152 provides an optimal means of incorporating airflow management features, especially in small form-factor disk-drives where space and part-cost limitations become extremely important.

Multiple flow control plates 152 would typically be used when the disk drive 10 has multiple data storage disks 18 (e.g., FIG. 6). In this regard, the flow control plate 152 includes a mounting section 176 that is disposed radially beyond an outer diameter 20 of a corresponding data storage disk 18. One of the flow control plates 152 may be disposed directly on the base plate 14 of the disk drive 10. The mounting section 176 of each additional flow control plate 152 may be stacked directly on the mounting section 176 of the underlying flow control plate 152. This stack of flow control plates 152 thereby extends in the same dimension in which the rotational axis of the various data storage disks used by the disk drive 10 extends. The various flow control plates 152 may be anchored relative to the disk drive 10 in any appropriate manner. One option would be to direct one or more threaded fasteners through the mounting section 176 of each flow control plate 152 and into threaded engagement with the base plate 14. Another option would be to direct one or more threaded fasteners through the mounting section 176 of the flow control plate 152 that is disposed directly on the base plate 14, and into threaded engagement with the base plate 14. Each additional flow control plate 152 in the stack could be detachably interconnected with the underlying flow control plate 152 using one or more threaded fasteners.

Any appropriate way of assembling the various flow control plates 152 into the disk drive 10 may be utilized. In one embodiment, the various data storage disks are positioned relative to the base plate 14 of the disk drive 10. The various flow control plates 152 are then sequentially stacked, starting with disposing one of the flow control plates 152 under the lowermost data storage disk 18 and on the base plate 14. This first flow control plate 152 also could be positioned on the base plate 14 prior to positioning the various data storage disks on the base plate 14. In any case, each subsequent flow control plate 152 may then be simply directed into the space between a corresponding pair of data storage disks 18 and disposed so that its mounting section 176 properly seats on the mounting section of the underlying flow control plate 152.

A number of variations of the flow control plate 152 of FIGS. 5-6B are illustrated in FIGS. 8A-D. Common components are identified by the same reference numeral, and the corresponding discussion presented above will remain applicable to these additional embodiments. The diffuser section $156^i$ of the flow control plate $152^i$ of FIG. 8A includes a plate 180. There are a number of points that may be made in relation to this plate 180, including:

1) the plate 180 is disposed within the pocket $160^i$; 2) the plate 180 is co-planar with the various base or transition sections $166^i$; 3) the plate 180 does not include any ridges $164^i$ or other protuberances, and includes a pair of flat, primary surfaces that are oppositely disposed; 4) the plate 180 is disposed radially inwardly of the portion of the diffuser section $156^i$ having the ridges $164^i$ (i.e., closer to a rotational axis of the associated data storage disk(s)); and 5) the plate 180 is about ½ of the size of the portion of the diffuser section $156^i$ that includes the ridges $164^i$ in one embodiment, although other relative sizings may be appropriate. Generally, the plate 180 may facilitate the diversion of a flow towards the inner diameter of the corresponding data storage disk(s). This may help alleviate the airflow-induced disturbances on the actuator arm, suspension, head/slider and rotating disks at the outermost tracks where the magnitude of track misregistration is usually at a maximum.

Figure 8A:
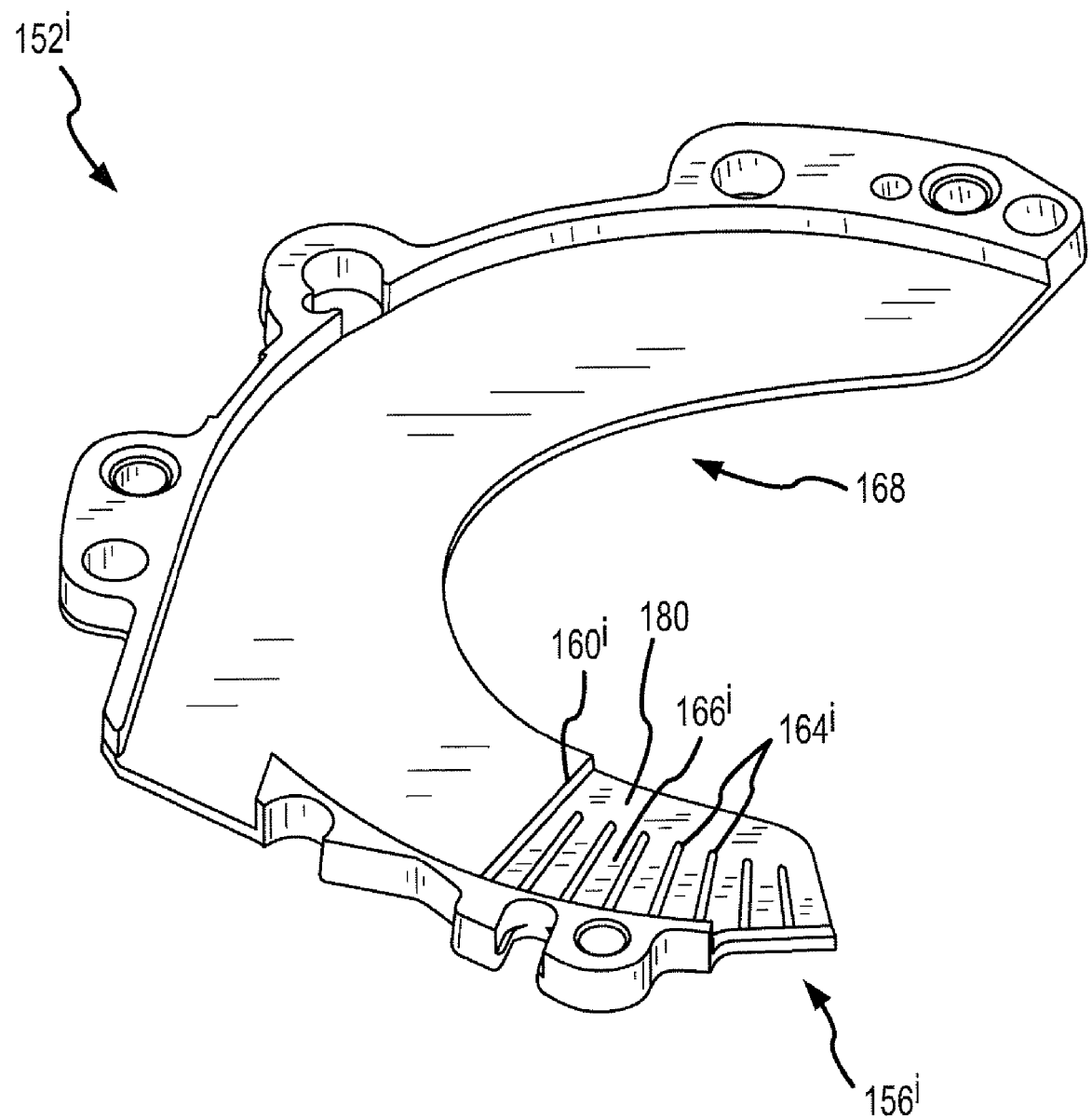
FIGS. 8A-D present alternative configurations for the flow control plate of FIG. 5.
Figure 8B:
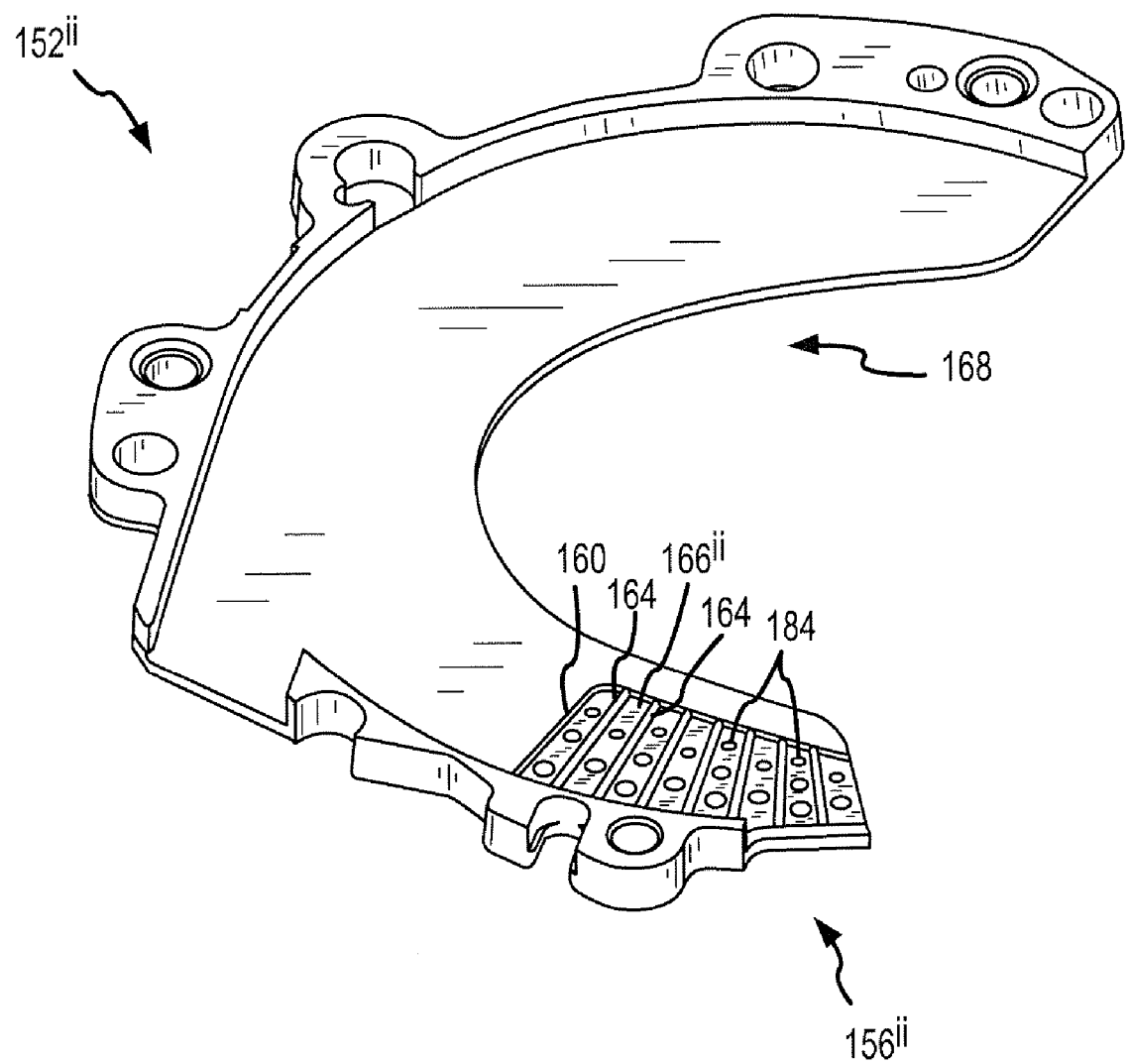

The diffuser section $156^{ii}$ of the flow control plate $152^{ii}$ of FIG. 8B includes at least one aperture 184 in each base or transition section $166^{ii}$. Each aperture 184 may be of any appropriate size, shape, and/or configuration. In the illustrated embodiment, each aperture 184 is circular. Any appropriate number of apertures 184 may be provided for each of the transition sections $166^{ii}$ (including having the same or a different number of apertures 184 in one or more of the transition sections $166^{ii}$). The aperture(s) 184 in each of the transition sections $166^{ii}$ may be disposed at any appropriate position, and multiple apertures 184 in any given transition section $166^{ii}$ may be disposed in any appropriate arrangement. In the illustrated embodiment: 1) multiple apertures 184 exist for each of the transition sections $166^{ii}$; 2) the size of the apertures 184 in each given transition section $166^{ii}$ decreases progressing in a radially inward direction; 3) adjacent transition sections $166^{ii}$ have different numbers of apertures 184; and 4) the apertures 184 of adjacent transition sections $166^{ii}$ are "radially staggered", or such that the center of each aperture 184 of each pair of adjacent transition sections $166^{ii}$ is disposed at a different distance from a rotational axis of the associated data storage disk(s). The inclusion of one or more apertures 184 further contributes to attempting to break down the turbulent eddies to various length scales.

Figure 8C:
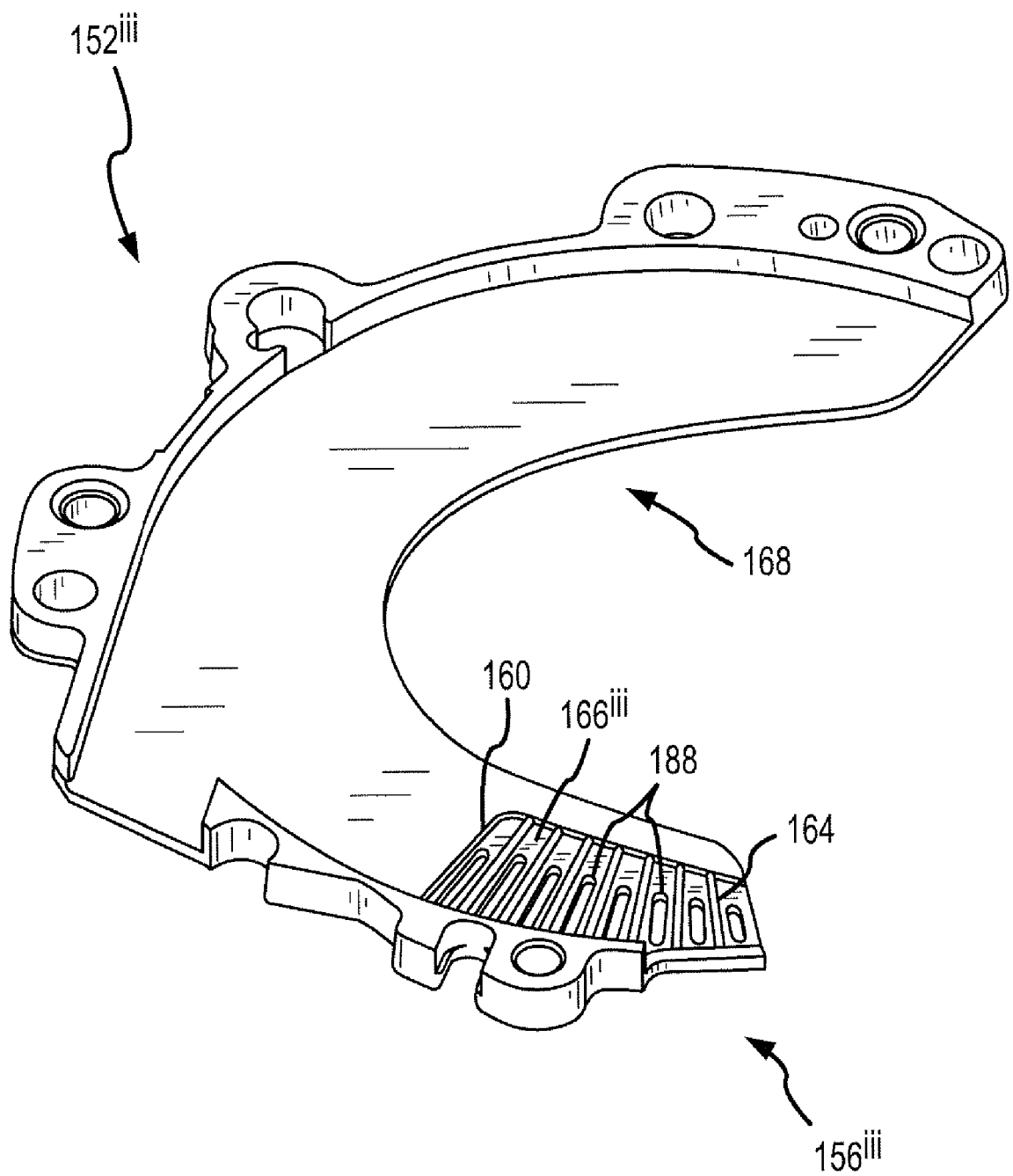

The diffuser section $156^{iii}$ of the flow control plate $152^{iii}$ of FIG. 8C includes a slot 188 in each base or transition section $166^{iii}$. The length dimension of each slot 188 in the illustrated embodiment is linear or axial, and furthermore at least generally coincides with the radial dimension (e.g., the length dimension of each slot 188 may extend along a radius extending from the rotational axis of the corresponding data storage disk(s)), although other length dimension configurations and/or orientations may be appropriate. Each slot 188 also extends about ½ of the length of its corresponding transition section $166^{iii}$. More specifically, an end of each slot 188 is disposed so as to coincide with the disk outer diameter or OD position, and terminates about ½ way proceeding in the direction of the disk inner diameter or ID direction. This type of configuration reduces airflow in the OD region of the corresponding data storage disk(s), and thereby reduces the airflow disturbance at the OD region of the corresponding data storage disk(s). Notwithstanding the foregoing, each slot 188 may be of any appropriate length, and furthermore may be disposed at any appropriate position and in any appropriate orientation on its corresponding transition section $166^{iii}$. One or more slots 188 may also be of a different length than at least one other slot 188.

Figure 8D:
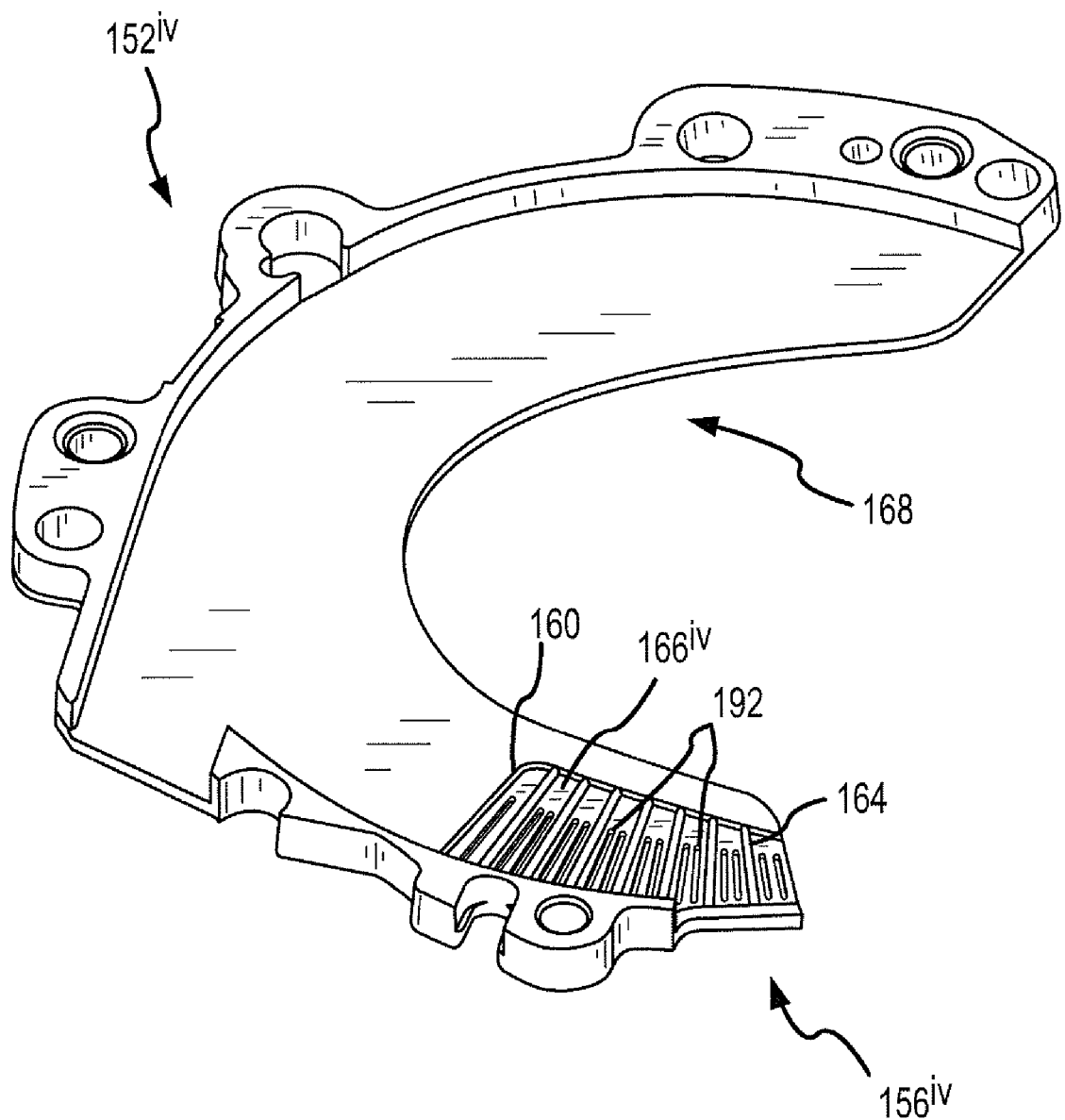

The diffuser section $156^{iv}$ of the flow control plate $152^{iv}$ of FIG. 8D includes multiple slots 192 in one or more of the base or transition sections $166^{iv}$. The length dimension of each slot 192 in the illustrated embodiment is linear or axial, and furthermore at least generally coincides with the radial dimension (e.g., the length dimension of each slot 188 may extend along a radius extending from the rotational axis of the corresponding data storage disk(s)), although other length dimension configurations and/or orientations may be appropriate. Any appropriate number of slots 192 may be used by each particular transition section $166^{iv}$. Each transition section $166^{iv}$ may include the same number of slots 192. One or more transition sections $166^{iv}$ may also utilize a different number of slots 192 compared to one or more other transition sections $166^{iv}$. Finally, each slot 192 may be of any appropriate length, and furthermore may be disposed at any appropriate position and in any appropriate orientation on its corresponding transition section $166^{iv}$.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A disk drive, comprising:
   a data storage disk that is rotatable; and
   a flow control plate associated with said data storage disk and comprising a diffuser section and an air displacement section, wherein said diffuser section comprises a plurality of protuberances spaced relative to each other, and wherein said diffuser section further comprises at least one aperture between at least one adjacent pair of said protuberances.

2. The disk drive of claim 1, wherein said flow control plate is formed from a resinous material.

3. The disk drive of claim 1, wherein said flow control plate is an integral structure such that said flow control plate lacks any joint between said diffuser section and said air displacement section.

4. The disk drive of claim 1, wherein said diffuser section is upstream of a corresponding transducer in relation to a rotational direction of said data storage disk, and wherein an entirety of said air displacement section is upstream of said diffuser section in relation to said rotational direction of said data storage disk.

5. The disk drive of claim 1, wherein said data storage disk comprises first and second data storage surfaces that are oppositely disposed, wherein said air displacement section is spaced from said first data storage surface by a distance of no more than about 0.50 mm.

6. The disk drive of claim 1, wherein each of said plurality of protuberances is axially extending.

7. The disk drive of claim 6, wherein a planar surface is disposed between each adjacent pair of said plurality of protuberances.

8. The disk drive of claim 7, wherein each of said plurality of protuberances extends along a radii emanating from a rotational axis of said data storage disk.

9. The disk drive of claim 1, wherein said air displacement section comprises a pair of flat surfaces that are oppositely disposed, wherein an apex of each of said plurality of protuberances is at least substantially coplanar with one of said flat surfaces of said air displacement section.

10. The disk drive of claim 1, wherein said air displacement section comprises a pair of flat surfaces that are oppositely disposed, wherein an apex of each of said plurality of protuberances fails to protrude beyond a reference plane that contains said flat surface of said air displacement section that adjoins said diffuser section.

11. The disk drive of claim 1, wherein said air displacement section comprises a pair of flat surfaces that are oppositely disposed, wherein one of said flat surfaces faces said data storage disk.

12. The disk drive of claim 1, wherein an angular extent of said air displacement section relative to a rotational axis of said data storage disk is greater than an angular extent of said diffuser section relative to said rotational axis of said first data storage disk.

13. The disk drive of claim 1, wherein said data storage disk is a first data storage disk, wherein said flow control plate is a first flow control plate, wherein said plurality of protuberances is a first plurality of protuberances, said disk drive further comprising:

a second data storage disk; and a second flow control plate associated with said second data storage disk and comprising a diffuser section and an air displacement section, wherein said diffuser section of said second data storage disk includes a second plurality of protuberances spaced relative to each other and at least one aperture between at least one adjacent pair of said protuberances of the second plurality of protuberances, and wherein said first and second flow control plates are separately disposed in a common stack.

14. The disk drive of claim 1, wherein said data storage disk is a first data storage disk, wherein said plurality of protuberances is a first plurality of protuberances, said disk drive further comprising a second data storage disk, wherein said flow control plate is positioned between said first data storage disk and said second data storage disk such that said flow control plate is associated with both said first data storage disk and said second data storage disk, said first plurality of protuberances facing said first data storage disk, said diffuser further comprising a second plurality of protuberances facing said second data storage disk.

15. A disk drive, comprising:

a first data storage disk that is rotatable; and a first flow control plate associated with said first data storage disk and comprising a diffuser section and an air displacement section, wherein said first flow control plate comprises a first pocket, wherein an entirety of said diffuser section is located within said first pocket, wherein an entirety of said air displacement section is located outside of said first pocket, wherein said diffuser section comprises a plurality of protuberances that are spaced relative to each other, further comprising at least one aperture between at least one adjacent pair of said protuberances.

16. The disk drive of claim 15, further comprising:

a first aperture between the at least one adjacent pair of said protuberances; and a second aperture between the at least one adjacent pair of said protuberances, wherein the first aperture is spaced radially inward from the second aperture.

17. The disk drive of claim 16, wherein the first aperture has a smaller diameter than the second aperture.

18. The disk drive of claim 15, wherein the first aperture has an elliptical perimeter, wherein a long axis of the elliptical perimeter is oriented radially.

19. A disk drive, comprising:

a first data storage disk that is rotatable; and a first flow control plate associated with said first data storage disk and comprising a diffuser section and an air displacement section, wherein said first flow control plate comprises a first pocket, wherein an entirety of said diffuser section is located within said first pocket, wherein an entirety of said air displacement section is located outside of said first pocket, wherein said diffuser section comprises a plurality of protuberances that are spaced relative to each other, wherein said diffuser section comprises first and second regions, wherein said plurality of protuberances are disposed within said first region, wherein said second region is entirely planar, and wherein said second region is disposed inwardly of said first region in relation to a rotational axis of said first data storage disk.

20. A disk drive, comprising:

a data storage disk that is rotatable; and a flow control plate associated with the data storage disk and comprising a diffuser section and an air displacement section, wherein the diffuser section comprises a plurality of protuberances spaced relative to each other, wherein the diffuser section comprises first and second regions, wherein the plurality of protuberances are disposed within the first region, wherein the second region is entirely planar, and wherein the second region is disposed inwardly of the first region in relation to a rotational axis of the first data storage disk.

21. The disk drive of claim 20, wherein the diffuser section comprises at least one aperture between at least one adjacent pair of the protuberances.

22. The disk drive of claim 20, wherein the first flow control plate comprises a pocket, wherein the plurality of protuberances is located entirely within the pocket and the second region is located outside the pocket.

23. The disk drive of claim 20, wherein the air displacement section comprises a pair of flat surfaces that are oppositely disposed, wherein an apex of each of the plurality of protuberances is at least substantially coplanar with one of the flat surfaces of the air displacement section.

24. The disk drive of claim 20, wherein the air displacement section comprises a pair of flat surfaces that are oppositely disposed, wherein an apex of each of the plurality of protuberances fails to protrude beyond a reference plane that contains the flat surface of the air displacement section that is on a common side of the flow control plate with the plurality of protuberances.

25. The disk drive of claim 20, wherein the data storage disk is a first data storage disk, wherein the plurality of protuberances is a first plurality of protuberances, the disk drive further comprising a second data storage disk, wherein the flow control plate is positioned between the first data storage disk and the second data storage disk such that the flow control plate is associated with both the first data storage disk and the second data storage disk, the first plurality of protuberances facing the first data storage disk, the diffuser further comprising a second plurality of protuberances facing the second data storage disk, wherein the second plurality of protuberances are disposed within the first region.

* * * * *